(12) United States Patent
Jo

(10) Patent No.: US 10,029,553 B2
(45) Date of Patent: Jul. 24, 2018

(54) HYDRAULIC ENGINE MOUNT WITH TWO CHANNELS

(71) Applicant: DTR Co., Ltd., Yangsan-si, Gyeongsangnam-do (KR)

(72) Inventor: Woo Seon Jo, Yangsan-si (KR)

(73) Assignee: DTR CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 15/359,818

(22) Filed: Nov. 23, 2016

(65) Prior Publication Data

US 2018/0056771 A1    Mar. 1, 2018

(30) Foreign Application Priority Data

Aug. 26, 2016 (KR) .................. 10-2016-0109510

(51) Int. Cl.
*F16M 5/00* (2006.01)
*B60K 5/12* (2006.01)
(Continued)

(52) U.S. Cl.
CPC ............... *B60K 5/12* (2013.01); *F16F 9/066* (2013.01); *F16F 9/3207* (2013.01); *F16F 9/34* (2013.01); *F16F 9/38* (2013.01); *F16F 13/20* (2013.01); *F16F 13/26* (2013.01); *B60Y 2400/48* (2013.01); *F16F 2222/12* (2013.01); *F16F 2228/04* (2013.01); *F16F 2228/06* (2013.01)

(58) Field of Classification Search
CPC ................. F16M 5/00; F16F 5/00; F16F 9/00
USPC ....... 248/550, 562, 566; 267/140.11–140.15, 267/140.2–140.5, 141.1–141.7
See application file for complete search history.

(56) References Cited

U.S. PATENT DOCUMENTS 4,840,358 A * 6/1989 Hoying ................... F16F 13/20
248/566
5,123,635 A * 6/1992 Bouhours ............... F16F 13/28
267/140.14
(Continued)

FOREIGN PATENT DOCUMENTS

JP       62127539 A      6/1987
JP       10103401 A      4/1998
KR   1020100124299 A    11/2010

OTHER PUBLICATIONS

Extended European Search Report issued in the corresponding European Application No. 17154995.9 dated Oct. 30, 2017.

*Primary Examiner* — Christopher P Schwartz
(74) *Attorney, Agent, or Firm* — Roberts Mlotkowski Safran Cole & Calderon P.C.

(57) ABSTRACT

A hydraulic engine mount with two channels is provided, which reduces vibration effectively in ignition mode and rough road mode, improves performance in noise, vibration, harshness (NVH) in a vehicle with stop/start function. The hydraulic engine mount with two channels, provided with a dividing means, comprises a first channel formed along a first path of the dividing means and providing a moving path of fluid between an upper fluid chamber and a lower fluid chamber, a second channel formed along a second path of the dividing means and providing a moving path of fluid between the upper fluid chamber and the lower fluid chamber, and a solenoid device having a first solenoid valve body installed in the housing and configured for opening and closing the second channel.

8 Claims, 12 Drawing Sheets

(51) Int. Cl.
*F16F 9/06* (2006.01)
*F16F 9/32* (2006.01)
*F16F 9/34* (2006.01)
*F16F 9/38* (2006.01)
*F16F 13/20* (2006.01)
*F16F 13/26* (2006.01)

(56) References Cited

U.S. PATENT DOCUMENTS

| | | | | |
|---|---|---|---|---|
| 5,443,574 | A * | 8/1995 | Ohtake | F16F 13/262 |
| | | | | 267/140.14 |
| 5,639,073 | A * | 6/1997 | Suzuki | F16F 13/26 |
| | | | | 267/140.13 |
| 5,839,720 | A * | 11/1998 | Kojima | F16F 13/26 |
| | | | | 267/140.14 |
| 6,017,024 | A * | 1/2000 | Muramatsu | F16F 13/20 |
| | | | | 267/140.14 |
| 6,264,181 | B1 * | 7/2001 | Muramatsu | F16F 13/264 |
| | | | | 267/140.13 |
| 2002/0163112 | A1 | 11/2002 | Freudenberg et al. | |
| 2003/0011117 | A1 * | 1/2003 | Nishi | F16F 13/268 |
| | | | | 267/140.14 |
| 2005/0258581 | A1 | 11/2005 | Tanaka | |
| 2008/0296818 | A1 * | 12/2008 | Koyama | F16F 13/26 |
| | | | | 267/140.14 |
| 2010/0096789 | A1 * | 4/2010 | Gannon | B60K 5/1266 |
| | | | | 267/140.15 |
| 2010/0219570 | A1 * | 9/2010 | Kojima | F16F 13/264 |
| | | | | 267/140.13 |
| 2012/0049424 | A1 | 3/2012 | Bradshaw et al. | |
| 2015/0377317 | A1 | 12/2015 | McDonough et al. | |

* cited by examiner

[Figure 1]
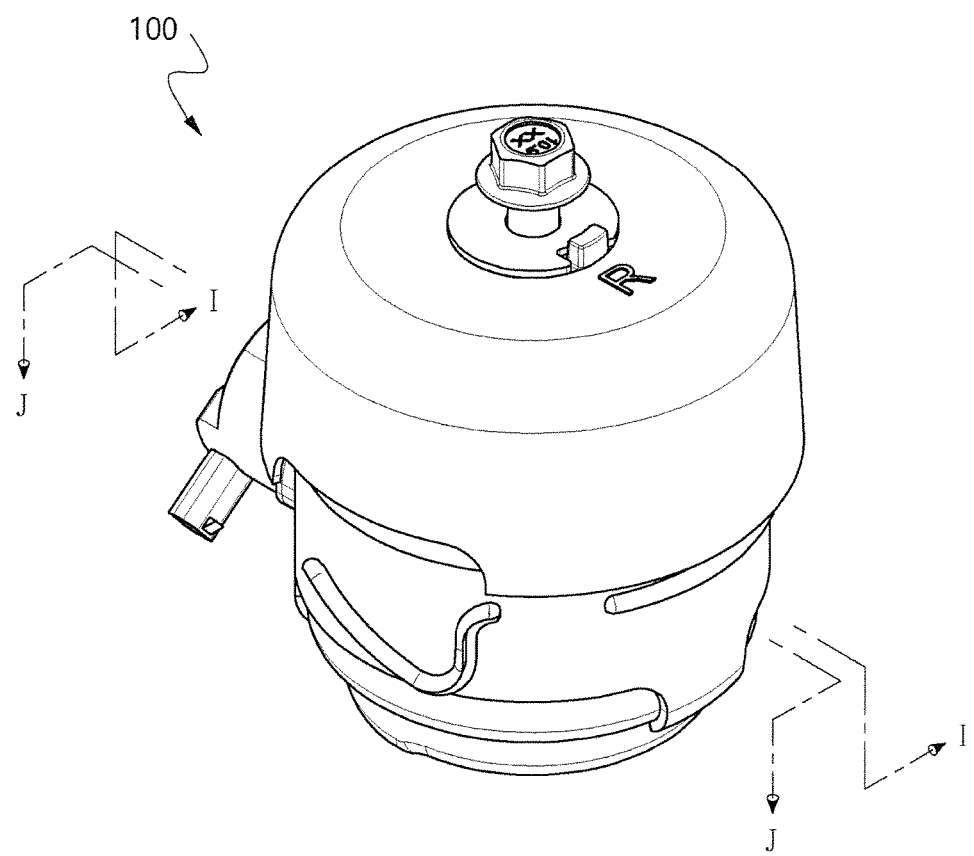

[Figure 2]
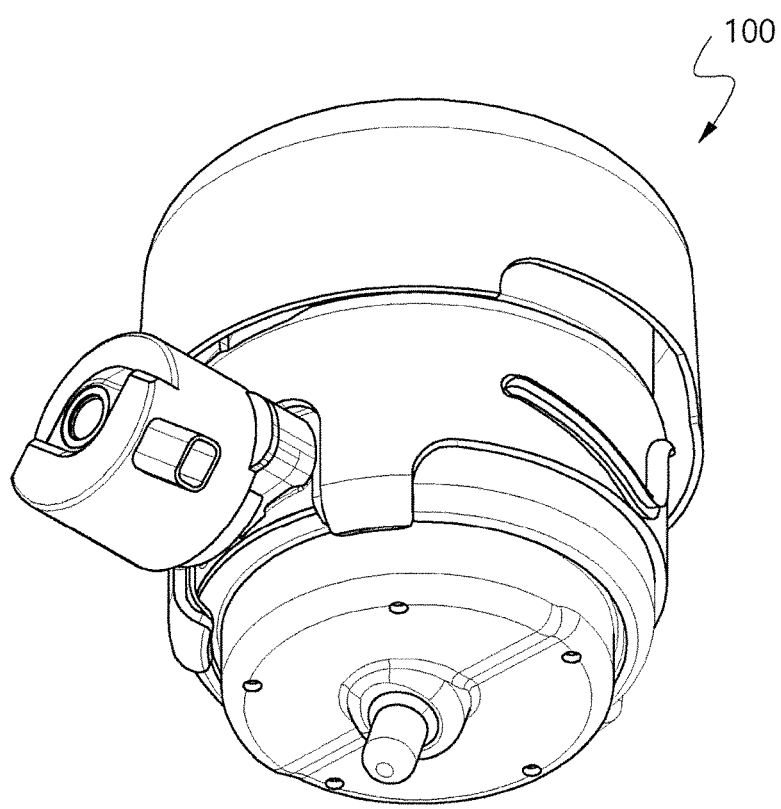

[Figure 3]
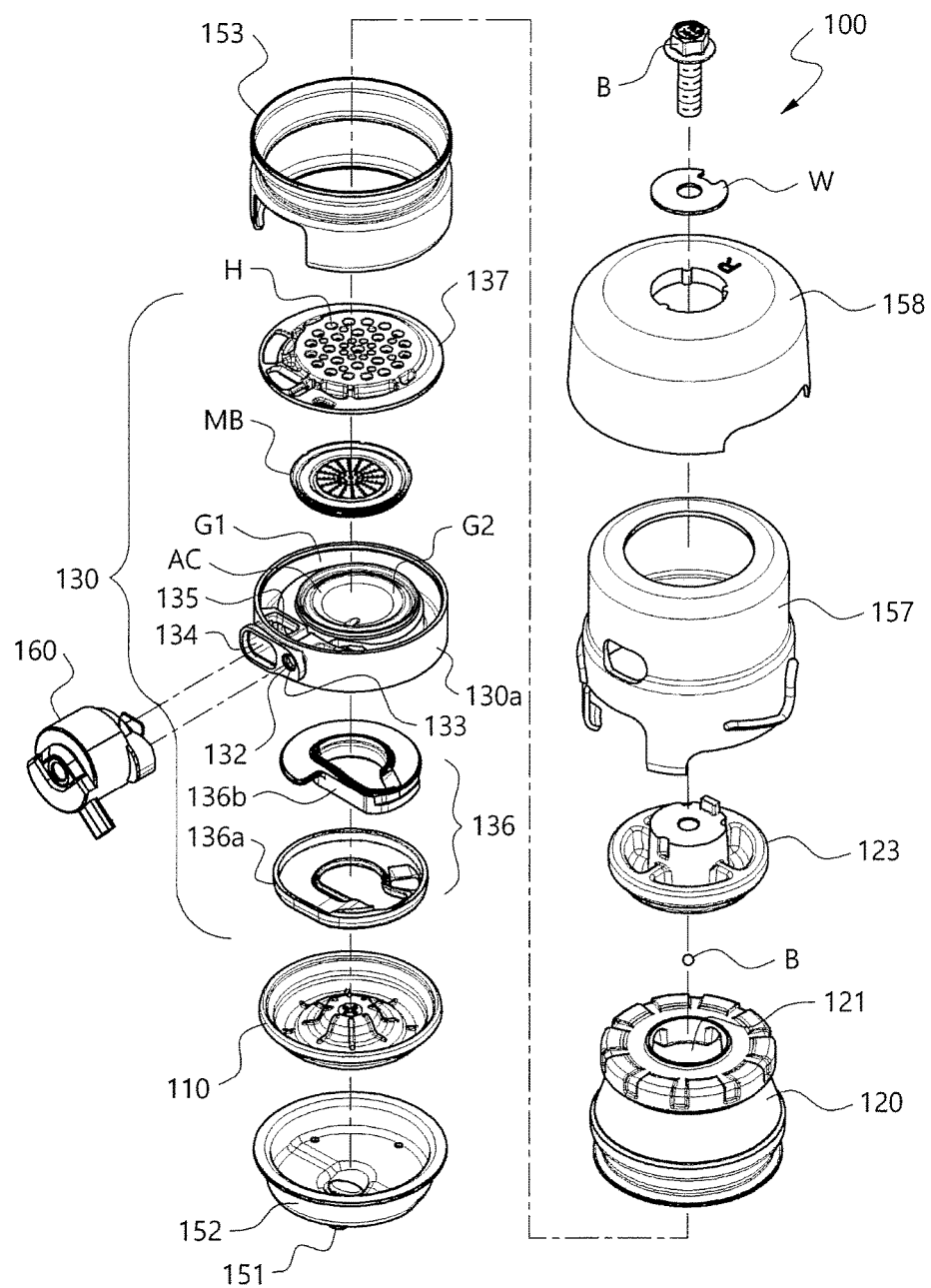

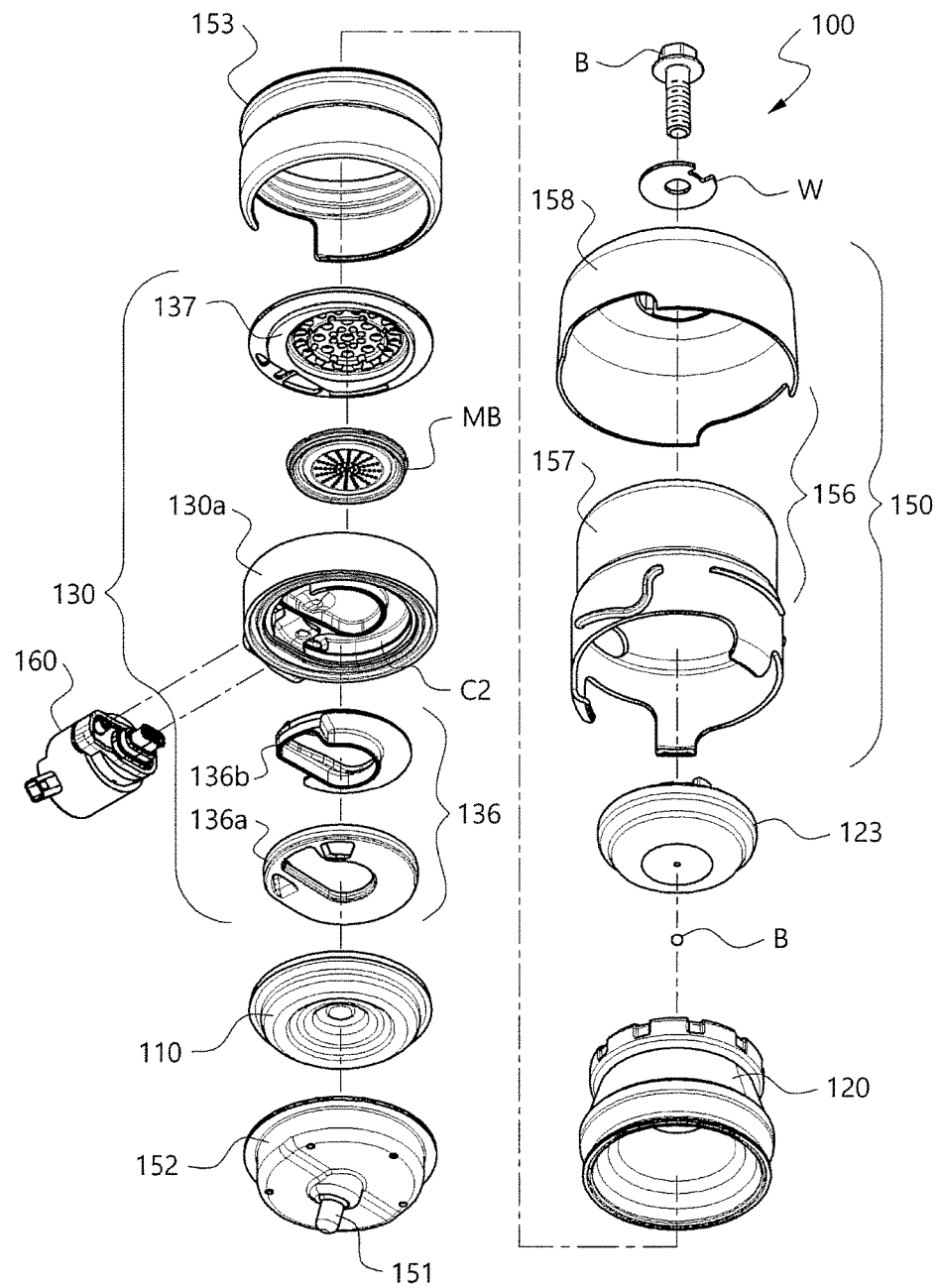
[Figure 4]

[Figure 5]
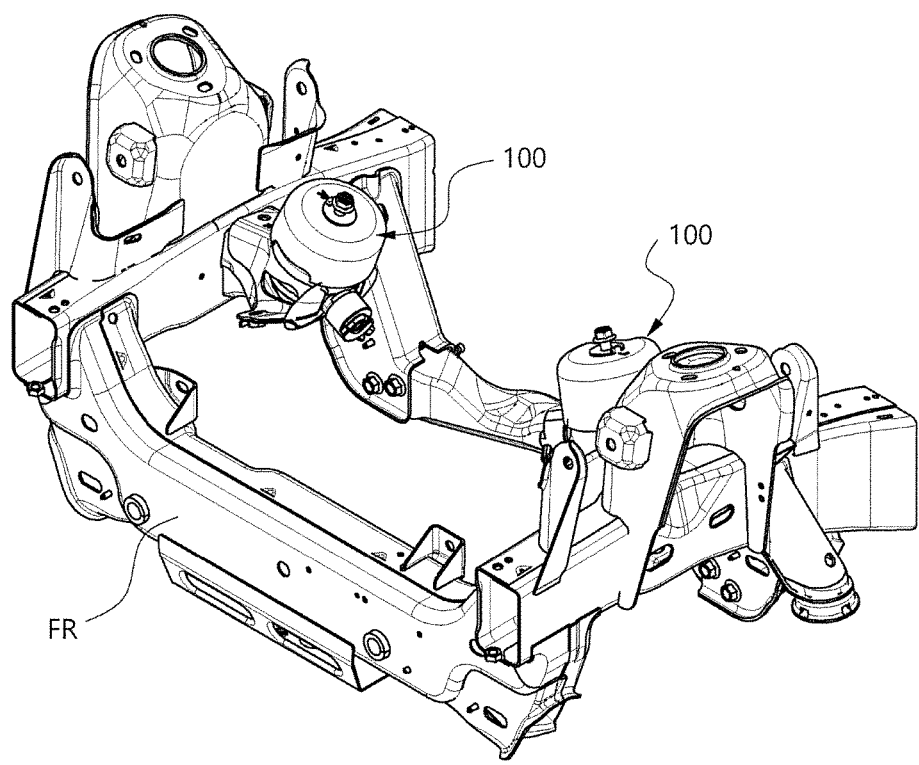

[Figure 6]
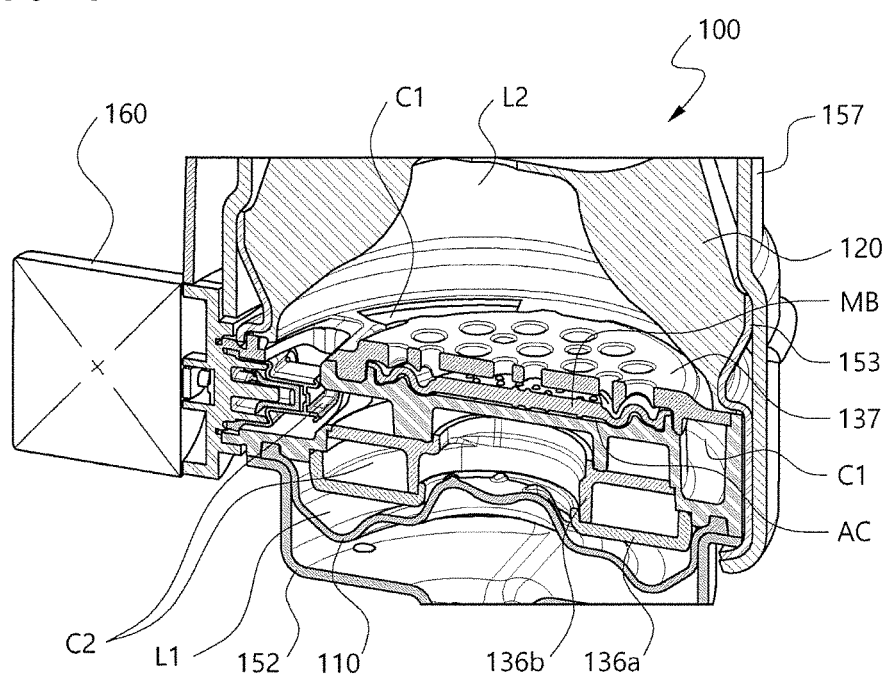

[Figure 7]
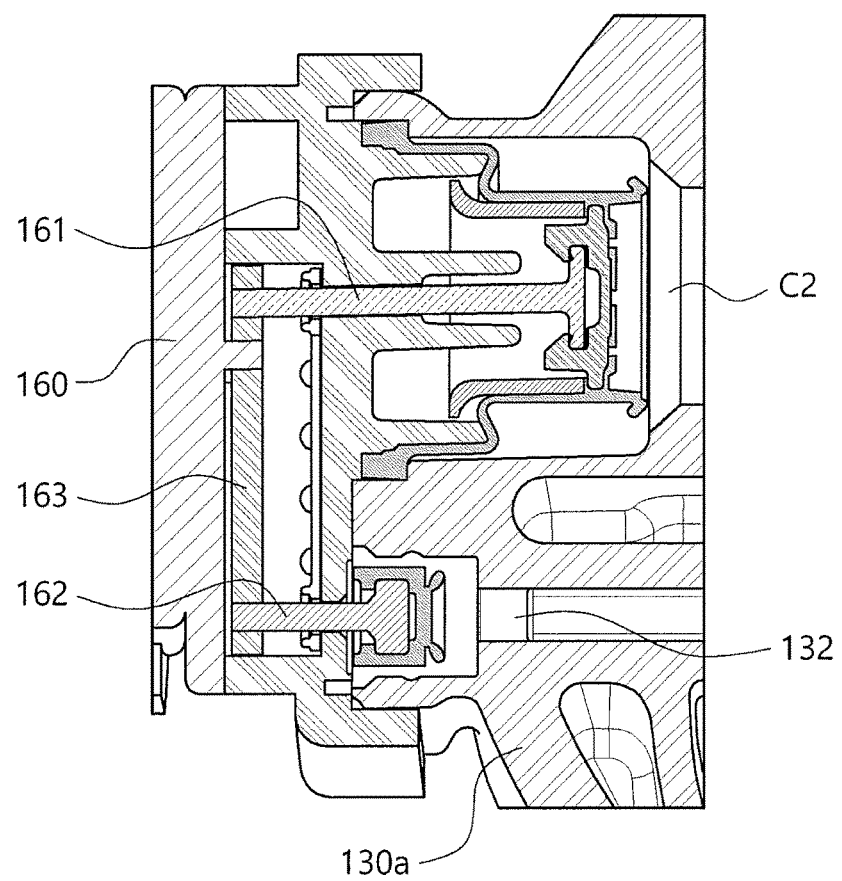

[Figure 8]
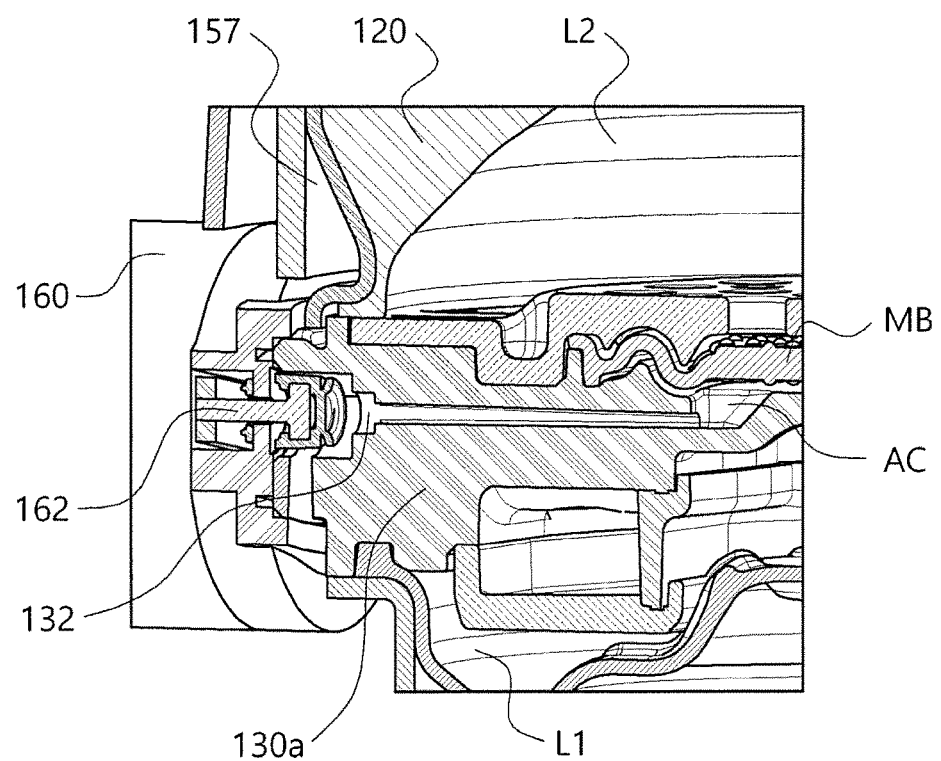

[Figure 9a]
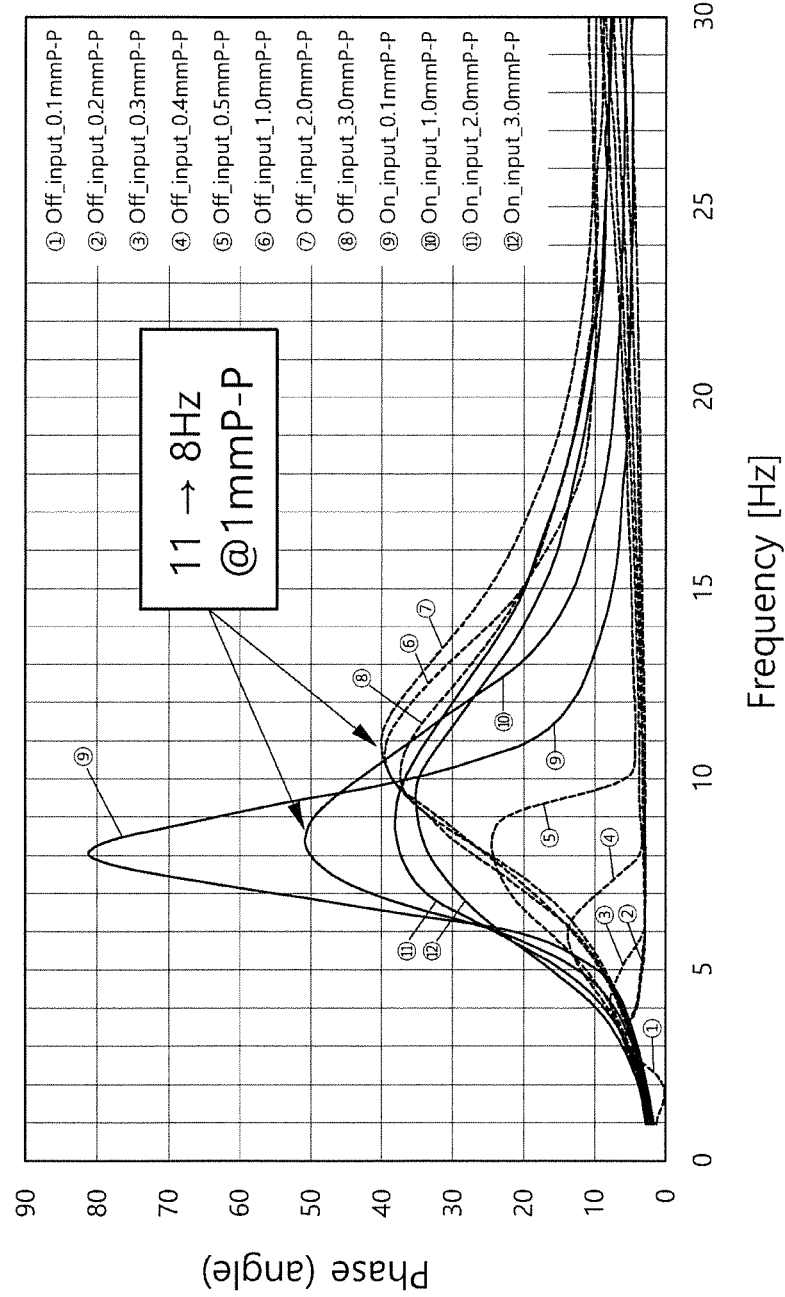

[Figure 9b]
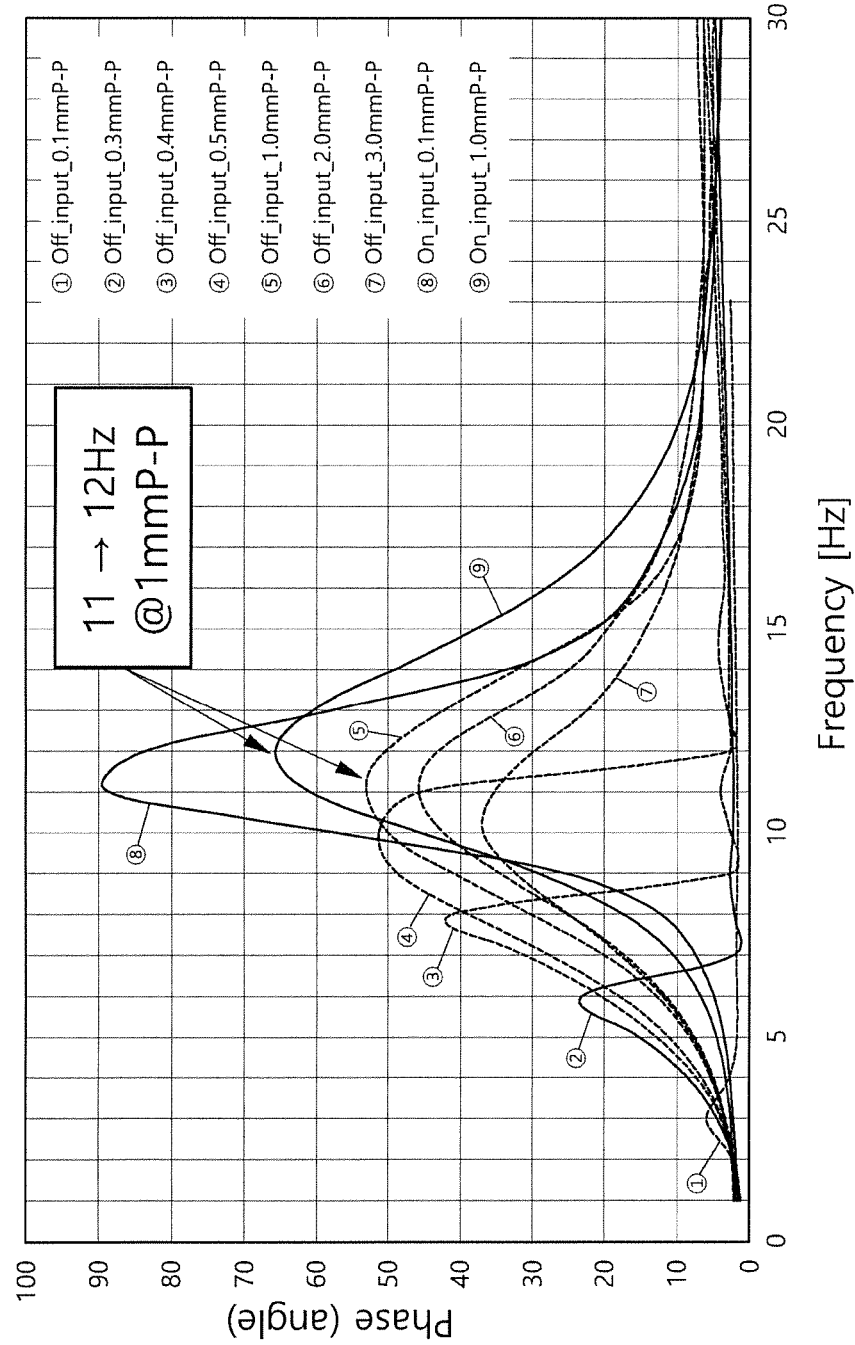

[Figure 10a]
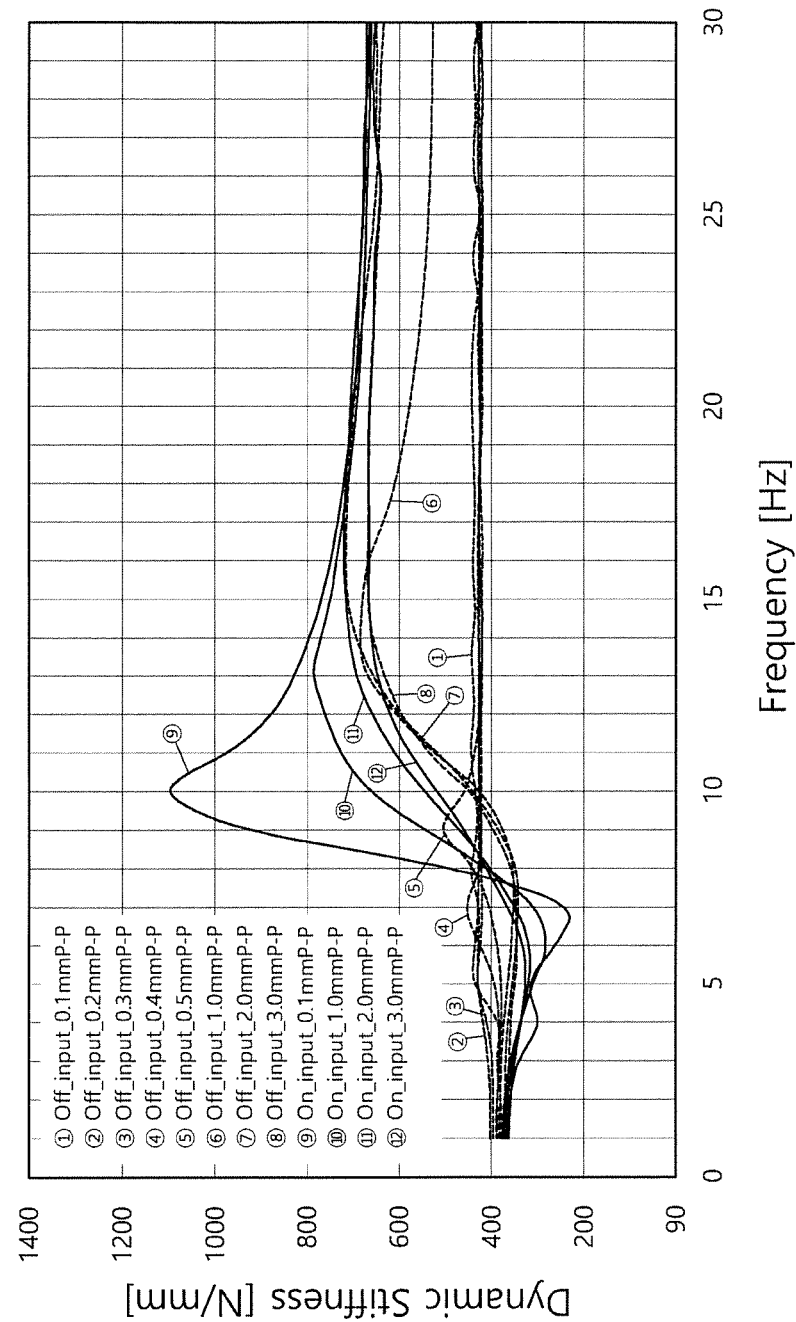

[Figure 10b]
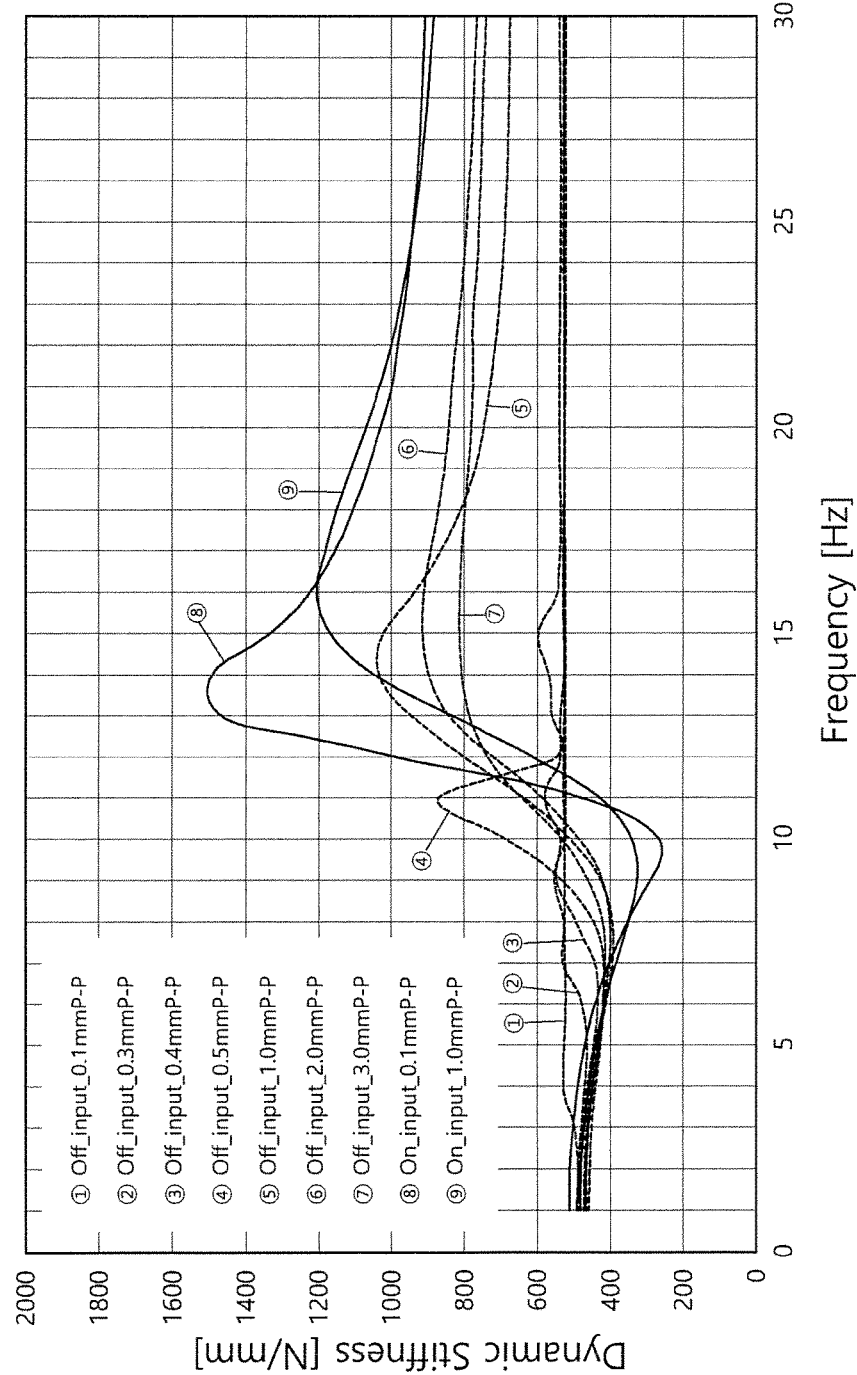

HYDRAULIC ENGINE MOUNT WITH TWO CHANNELS

FIELD OF TECHNOLOGY

The present invention relates to a hydraulic engine mount, more specifically to an improvement of a hydraulic engine mount, controlling the peak damping frequency and controlling the damping property according to the operation states of a vehicle by closing and opening a flow path between an upper fluid chamber and a lower fluid chamber.

BACKGROUND OF INVENTION

In general, the low dynamic stiffness of engine mount is good for the idle state or low-speed driving of a vehicle, and the large dynamic stiffness of engine mount is good for a high-speed driving.

The conventional hydraulic engine mount has a housing sealed with liquid at a lower portion of a rubber elastic body performing a first shock-absorbing function. The inside of the housing is divided into a top fluid chamber and a bottom fluid chamber by a dividing means installed therein, and in the dividing means is formed one fluid-moving channel through which fluid can move between the bottom fluid chamber and the top fluid chamber. By changing the dynamic stiffness of engine mount through opening and closing of the fluid-moving channel it enables to reduce vibrations of frequency range generated from the engine during an idle state or low-speed driving and vibrations of frequency range generated from the engine during an high-speed driving as effectively according to frequency as possible, but it could not make peak damping around two corresponding frequency ranges.

Especially, an engine mount is being developed, which can reduce vibration more efficiently in each corresponding frequency by changing the dynamic stiffness of the engine mount through opening and closing the one fluid-moving channel or the air track connected with the atmosphere in an ignition mode (7~8 Hz) and the rough road driving mode (11~13 Hz) in a vehicle having a function of stop/start, but an engine mount has not been developed yet, which has an excellent damping property in both the ignition mode (7~8 Hz) and the rough road driving mode (11~13 Hz).

Since the above conventional engine mount has only one fluid-moving channel, it is impossible to make a large variation of peak damping frequency according to opening and closing of the fluid-moving path. That is, the conventional engine mount cannot reduce vibration efficiently in each of different modes, and cannot form peak damping frequency ranges tuned accurately to the frequency corresponding to the ignition mode (7~8 Hz) and the rough road driving mode (11~13 Hz). Thus the conventional engine mount compromises fittingly in evaluating a vehicle and developing process of engine mount, and sets the peak damping frequencies to 8 Hz and 10 Hz or 9 Hz and 11 Hz, for example. Therefore, the conventional engine mount achieves some vibration reduction effect in a single mode, but the vibration reduction capability in other modes is decreased.

Also, since the conventional engine mount has only one fluid-moving path and thus performs the damping function only with states of closing and opening upper and lower fluid chambers completely, it is difficult to have it perform peak damping according to various frequency ranges.

DESCRIPTION

Problems to Solve

An object of the invention is to provide a hydraulic engine mount, which can reduce vibration effectively in each of different driving states having a large frequency differences by tuning to different frequency ranges from different driving states in order to make the peak damping frequency change large.

Another object of the invention is to provide a hydraulic engine mount, in which the peak damping in the ignition mode occurs at 8 Hz and the peak damping in the rough road driving mode occurs at 12 Hz.

Still another object of the invention is to provide a hydraulic engine mount, which can provide an excellent damping force in a frequency range where the conventional engine mount could not provide a good damping by giving a change in dynamic stiffness in a state of connecting upper and lower fluid chambers so that the dynamic stiffness can be changed in a state that one channel or all two channels are opened.

Still another object of the invention is to provide a hydraulic engine mount, in which resonance due to inertia track can occur at two different frequency ranges.

Still another object of the invention is to provide a hydraulic engine mount, which has an efficient damping structure.

Solutions to Problem

A hydraulic engine mount with two channels according to the invention has a dividing means for dividing an inner space of a housing into an upper fluid chamber and a lower fluid chamber and forming a channel for moving fluid between the upper fluid chamber and the lower fluid chamber, and the hydraulic engine mount comprises: a first channel forming a first path of the dividing means and providing a moving channel of fluid between the upper fluid chamber and the lower fluid chamber; a second channel forming a second path of the dividing means and providing a moving channel of fluid between the upper fluid chamber and the lower fluid chamber; and a solenoid device installed in the housing and having a first solenoid valve body for opening and closing the second channel.

Preferably, the dividing means forms an air chamber below a membrane, which is connected to an external atmosphere through the membrane installed on a top surface, and the solenoid device comprises a second solenoid valve body for opening and closing an entrance of the air chamber.

More preferably, the first solenoid valve body and the second solenoid valve body are connected to each other through an axle so that the second channel and the entrance of the air chamber are opened and closed at the same time by an operation of the solenoid device.

The dividing means comprises: a main body portion including a valve-installing portion to which each of end portions of the first solenoid valve body and the second solenoid valve body is inserted and installed, a spiral groove for forming the first channel spirally along an edge of the top surface, and a through-hole penetrating upwards and downwards through an edge and forming the entrance of the second channel; a second channel-forming member installed on a bottom surface of the main body portion, connected with the through-hole, and forming the second channel along an edge of the bottom surface of the main body portion; a membrane forming the air chamber by covering the top surface of the main body portion; and a cover plate forming the first channel by covering the spiral groove and having a hole, through which fluid in the upper fluid chamber passes, at a central portion.

Preferably, a pair of groove members are formed along an edge of the second channel-forming member so as to face each other in a direction of up and down.

If the first solenoid valve body and the second solenoid valve body close the second channel and the air chamber the fluid operates through the first channel generating the peak damping at a first frequency range of relatively low frequencies and maintains the closed state of the air chamber so as to increase damping force, wherein if the first solenoid valve body and the second solenoid valve body open the second channel and the air chamber the fluid operates through the first and second channels generating the peak damping at a second frequency range of relatively high frequencies so as to reduce damping force.

Preferably, the first frequency range is 7~8 Hz and the second frequency range is 11~12 Hz.

Effects of Invention

The conventional engine mount has nearly same value of peak damping frequency according to opening and closing of one fluid-moving channel between top and bottom fluid chambers. And since the conventional engine mount has a peak damping frequency mainly at 10~12 Hz, it has an effect to reduce vibration in a rough road condition only.

In contrast, since it has two fluid-moving channels according to the invention, the engine mount has different peak damping frequencies, reducing vibration effectively in both of the ignition mode and the rough road mode, and since the driver encounters the ignition mode frequently during a city driving especially in a vehicle having the stop/start function, the performance in noise, vibration, and harshness (NVH) can be improved.

According to the invention, it has two fluid-moving channels and one of the two channels and the air chamber can be opened and closed together, so that the degree of change of the peak damping frequency according to whether the solenoid device is operated or not is much larger than that of the prior arts, and thus the engine mount according to the invention can reduce vibration effectively in both of the range of 7~8 Hz that is generated at the time of the ignition mode and the range of 11~13 Hz that is generated at the time of driving in a rough road.

Also, according to the invention, since it can open and close the second channel and the air chamber at the same time using one solenoid device and does not have to use two solenoid devices, the structure is simple and the manufacturing cost is not increased much.

BRIEF DESCRIPTION OF DRAWINGS

FIG. 1 is a perspective view showing a hydraulic engine mount with two channels according to the invention;

FIG. 2 is a perspective view viewed from a bottom surface of the engine mount of FIG. 1;

FIG. 3 is an exploded perspective view of the engine mount of FIG. 1;

FIG. 4 is an exploded perspective view viewed from a bottom surface;

FIG. 5 is a perspective view showing a state that an engine mount with two channels according to the invention is installed in a vehicle frame;

FIG. 6 is a partially cross-sectional perspective view showing a partial vertical cross-sectional state along I-I of FIG. 1;

FIG. 7 is a partially cross-sectional plan view along J-J of FIG. 1;

FIG. 8 is a partially vertical cross-sectional perspective view showing an airway;

FIG. 9 is a graph showing a change of damping force in on/off state according to the frequency change in each specific input magnitude in terms of phase angle, (a) is about an engine mount with two channels according to the invention, and (b) is about a conventional engine mount with a single channel; and FIG. 10 shows a change of dynamic stiffness according to frequency change in each specific input amplitude, (a) is about an engine mount with two channels according to the invention, and (b) is about a conventional engine mount with a single channel.

DETAILED DESCRIPTION OF EMBODIMENTS OF INVENTION

Below, preferable embodiments of the invention are going to described referring to the attached drawings.

FIG. 1 is a perspective view showing a hydraulic engine mount with two channels according to the invention, FIG. 2 is a perspective view viewed from a bottom surface of the engine mount of FIG. 1, FIG. 3 is an exploded perspective view of the engine mount of FIG. 1, FIG. 4 is an exploded perspective view viewed from a bottom surface, FIG. 5 is a perspective view showing a state that an engine mount with two channels according to the invention is installed in a vehicle frame, FIG. 6 is a partially cross-sectional perspective view showing a partial vertical cross-sectional state along I-I of FIG. 1, FIG. 7 is a partially cross-sectional plan view along J-J of FIG. 1, and FIG. 8 is a partially vertical cross-sectional perspective view showing an airway.

Referring to FIGS. 1 to 8, a hydraulic engine mount with two channels (100) comprises a diaphragm (110) disposed at a bottom side, made of rubber, and forming a lower fluid chamber (L1), an upper rubber body (120) for forming an upper fluid chamber (L2), a stopper body (123) installed in a hole (121) at an upper central portion of the upper rubber body (120), a dividing means (130) installed between the diaphragm (110) and the upper rubber body (120), and dividing the upper fluid chamber (L2) and the lower fluid chamber (L1) up and down, and providing channel for fluid-moving between the two fluid chambers, a housing (150) for receiving and protecting the above components, and a solenoid device (160) installed at a side of the housing (150) and configured for opening and closing the channel.

Major features of the invention against prior arts are the dividing means (130) and the solenoid device (160). Before describing them in detail, the housing (150) is going to be described briefly as follows.

The housing (150) includes a lower case (152) with fixing protrusion (151) formed for fixing to the frame (FR) at a lower surface and an upper case (156) for installing bolt (B) and washer (W) for fixing an engine in the top central portion. Also the upper case (156) includes an upper case main body (157) enclosing an exterior surface of the upper rubber body (120), a connecting body (153) engaging a bottom end of the upper rubber body (120) in the upper case main body (157) and enclosing the dividing means (130) and having a bottom end connected with the lower case (152), and a cap (158) installed with bolt (B) and the like at a top central portion for fixing the engine and combined to the top side portion of the upper case main body (157).

The dividing means (130), one of the major features of the invention, is formed along a first path and provides a first channel (C1) for providing a moving path of fluid between the upper fluid chamber (L2) and the lower fluid chamber (L1) and a second channel (C2) formed along a second path and providing a moving path of fluid between the upper fluid chamber (L2) and the lower fluid chamber (L1).

The solenoid device (160) installed in the housing (150) has a first solenoid valve body (161) for opening and closing the second channel (C2).

Also, the dividing means (130) forms an air chamber (AC) connected with the external atmosphere below a membrane (MB) through the membrane installed on a top surface, and the solenoid device (160) has a second solenoid valve body (162) for opening and closing the entrance of the air chamber (AC).

As described in the above, the first solenoid valve body (161) and the second solenoid valve body (162) are connected to each other through the axle (163), so that the second channel (C2) and the entrance (132) of the air chamber (AC) are opened or closed at the same time through the operation of the one solenoid device (160).

Since the invention opens and closes the second channel (C2) and the air chamber (AC) at the same time with the one solenoid device (160), the operation of the solenoid device (160) can make the peak damping frequency change by much more than conventional ones.

The dividing means (130) as in the above provides a main body portion (130a) of a shape of cylinder overall and the membrane (MB) installed on the top surface.

Preferably, the main body portion (130a) is made of metal, and at the side surface thereof are formed valve-installing portions (133, 134) to which end portions of the first solenoid valve body (161) and the second solenoid valve body (162) are inserted and installed respectively. Also, on a top surface of the main body portion (130a) is formed a spiral groove (G1) spirally along a perimeter for forming the first channel (C1), and a through-hole (135) forming an entrance of the second channel (C2) is formed so as to penetrate an edge up and down.

And in the main body portion (130a) is formed a chamber groove (G2) so as to form the air chamber (AC) connected with the external atmosphere below the membrane (MB) through the membrane (MB) installed on the top surface, and the chamber groove (G2) is connected with the entrance (132) of the air chamber (AC) through airway formed in the main body portion (130a). The membrane (MB) covers the top surface of the main body portion (130a) and forms the air chamber (AC) together with the chamber groove (G2). The entrance (132) of the air chamber (AC) is opened and closed by the second solenoid valve body (162).

The dividing means (130) provides a second channel-forming member (136). The second channel-forming member (136) is installed on a bottom surface of the main body portion (130a). The second channel-forming member (136) is connected with the through-hole (135) and forms the second channel (C2) formed along the perimeter of the bottom surface. Such a second channel-forming member (136) is preferably formed by combining a pair of groove members (136a, 136b) formed with grooves along the perimeter so as to face each other up and down. The second channel-forming member (136) may be made of plastic suitably.

The dividing means (130) provides a cover plate (137). The cover plate (137) covers the spiral groove (G1) and forms the first channel (C1), so that a hole (H) is formed at the central portion, enabling fluid in the upper fluid chamber (L2) to pass therethrough.

In the hydraulic engine mount with two channels (100) having the above structure according to the invention, if the first solenoid valve body (161) and the second solenoid valve body (162) close the second channel (C2) and the air chamber (AC) at the same time through the solenoid device (160), the fluid operates through the first channel (C1) only, and the air chamber (AC) is closed, generating the peak damping at the first frequency range of low frequencies 7~8 Hz. In a state that the second channel (C2) is closed, if the air chamber (AC) is also closed, the damping force of the hydraulic engine mount with two channels (100) is increased further.

If the first solenoid valve body (161) and the second solenoid valve body (162) open the second channel (C2) and the air chamber (AC) through the operation of the solenoid device (160), the fluid operates through the first channel (C1) and the second channel (C2) and the air chamber (AC) is opened, generating the peak damping in the second frequency range of relatively higher frequencies 11~12 Hz than the first frequency range, and the damping force is reduced further due to the opening of the air chamber (AC).

That is, in the hydraulic engine mount with two channels (100) according to the invention, since the peak damping occurs in the first frequency range of relatively low frequencies 7~8 Hz and in the second frequency range of relatively higher frequencies 11~12 Hz than the first frequency range according to the opening or closing of the second channel (C2) and the air chamber (AC) by the means of the first solenoid valve body (161) and the second solenoid valve body (162), effective damping action may be obtained in both the ignition mode and the rough road driving mode.

FIG. 9 is a graph showing a change of damping force in on/off state according to the frequency change in each specific input magnitude in terms of phase angle, (a) is about an engine mount with two channels according to the invention, and (b) is about a conventional engine mount with a single channel, and FIG. 10 shows a change of dynamic stiffness according to frequency change in each specific input amplitude, (a) is about an engine mount with two channels according to the invention, and (b) is about a conventional engine mount with a single channel.

In the graph of FIG. 9, the vertical axis represents the amplitude of engine mount in terms of phase angle of sine wave and the horizontal axis represents the frequency of vibration input.

In the graph of FIG. 9(a), Off stands for the state of opening the entrance of the second channel (C2) and the entrance (132) of the air chamber (AC), and On stands for the state of closing the entrance of the second channel (C2) and the entrance (132) of the air chamber (AC). And the numerical values represent the peak to peak displacement of sine wave of vibration input, that is, the amplitude in the unit of millimeter (mm).

In the graph of FIG. 9(b), Off stands for the state of opening all the channel and the air chamber in the conventional single channel engine mount, and On stands for the state of closing the air chamber.

The following description also refers to FIGS. 1 through 8.

If the air chamber (AC) is closed in the hydraulic engine mount with two channels (100) according to the invention and the conventional one channel engine mount, the pressure of the air chamber (AC) below the membrane (MB) rises, the value of phase angle showing damping force reducing vibration input to the engine mount from outside in a specific frequency increases in both of them.

Comparing both cases referring to FIGS. 9(*a*) and 9(*b*), if the frequency is increased while inputting vibration of 1 mm of amplitude in the hydraulic engine mount with two channels (100) according to the invention, the peak damping occurs at 11 Hz in the state of opening the entrance of the second channel (C2) and the entrance (132) of the air chamber (AC), and the peak damping occurs at about 8.3 Hz in the state of closing the entrance of the second channel (C2) and the entrance (132) of the air chamber (AC).

That is, in the hydraulic engine mount with two channels (100) according to the invention, by opening and closing the second channel (C2) and the air chamber (AC) at the same time by the operation of valve device, the peak damping frequency can be changed from 11 Hz to 8.3 Hz, by approximately 2.7 Hz.

On the other hand, if increasing the frequency while inputting vibration with 1 mm of amplitude in the conventional one channel engine mount, the peak damping occurs at 11 Hz in the state of opening the one channel and the air chamber, and the peak damping occurs at 12 Hz in the state of closing the air chamber, and therefore, since the change of peak damping frequency according to opening and closing valve is small, it cannot reduce vibration effectively in both of the rough road driving mode (11~13 Hz) and the ignition mode (7~8 Hz).

Also, in the hydraulic engine mount with two channels (100) according to the invention, the peak damping occurs in the vicinity of 8 and 9 Hz in the state of closed valve shown in solid line to vibration of other different amplitudes, in a state that the valve is opened as shown in dash line, the peak damping occurred around 11 Hz almost all the cases.

That is, in a case of using the hydraulic engine mount with two channels (100) according to the invention, in a vehicle with a Stop/start function, in the ignition mode (7~8 Hz) the vibration can be reduced by generating peak damping around 8 Hz by closing the first and second valve bodies (61, 62), and also in the rough road driving mode (11~13 Hz) the vibration can be reduced effectively by generating the peak damping around 11 Hz by opening the first and second valve bodies (61, 62).

In contrast, in the conventional one channel engine mount, since the peak damping occurs at 11 Hz and 12 Hz in a state of closing the valve shown in a solid line with respect to the input vibrations of other different amplitudes and the peak damping occurs around 10 Hz and 11 Hz in most of the cases in a state of opening the valve shown in a dashed line, the vibration of the vehicle may be reduced effectively in the rough road driving state (11~13 Hz) in the conventional one channel engine mount, but the vibration in the ignition mode (7~8 Hz) of a vehicle with the Stop/start function cannot be reduced effectively because the peak damping frequency change is small. This holds true when the one channel is opened and closed instead of the air chamber.

On the other hand, referring to FIGS. 10(*a*) and 10(*b*), in the hydraulic engine mount with two channels (100) according to the invention, since the first channel (C1) only or all the first and second channels (C1, C2) and the air chamber (AC) are opened in states of opening and cloning the first and second valve bodies (61, 62), the dynamic stiffness is known to be reduced in all the input amplitudes, comparing with the conventional one channel hydraulic engine mount which opens one channel or one air chamber only, or one channel and one air chamber.

However, in the conventional engine mount, since a dynamic stiffness of about 800 N/mm or above at the rough road driving mode (11~13 Hz) is obtained, it can achieve some damping capability, but in the ignition mode (7~8 Hz), it maintains a dynamic stiffness of about 500 N/mm and cannot obtain enough of damping capability.

In contrast, in the engine mount according to the invention, the dynamic stiffness of the engine mount can be maintained low to be as low as below 420 N/mm in the ignition mode (7~8 Hz), and in the rough road driving mode (11~13 Hz) the dynamic stiffness of the engine mount can be maintained to be as high as 620~950 N/mm, so that the damping performance can be obtained even in the rough road driving mode (11~13 Hz).

The operation procedure of the hydraulic engine mount with two channels (100) according to the invention is described below referring to the above drawings.

If starting a vehicle with the Stop/start function, the engine is ignited, the vehicle is in the ignition mode (7~8 Hz), and 7~8 Hz of vibration occurs in the engine. This vibration state makes the driver experience frequently also at the time of stop/start of the vehicle with stop/start function, causing frequent discomfort. In a vehicle installed with a hydraulic engine mount with two channels (100) according to the invention, at the time of the ignition mode or stop/start mode, the solenoid device (160) is operated, so that the first solenoid valve body (161) and the second solenoid valve body (162) close the second channel (C2) and the air chamber (AC). If the second channel (C2) and the air chamber (AC) are closed, fluid in the second channel (C2) does not operate, and fluid in the first channel (C1) only operates, generating the peak damping at 7~8 Hz, and as the air chamber (AC) is closed the value of phase angle gets increased.

In the first and second valve bodies are opened in the rough road driving state, all fluid in the first and second channels operate, and the value of phase angle drops, but the peak damping moves to the 11~12 Hz frequency range, so that the vibration of engine in the rough road driving state is reduced effectively.

INDUSTRIAL APPLICATIONS

The present invention can be applied to make a hydraulic engine mount, which is installed in the vehicle frame and suppresses delivery of vibration between the engine and the frame by supporting elastically between the frame and the engine and suppresses vibration generated in the engine.

LEGENDS

| | |
|---|---|
| 100: hydraulic engine mount with two channels | 110: diaphragm |
| 120: upper rubber body | 130: dividing means |
| 130a: main body portion | 132: entrance of air chamber |
| 133, 134: valve body installing portion | 136: second channel-forming member |
| 137: cover plate | 150: housing |
| 160: solenoid device | 161: first valve body |
| 162: second valve body | 163: axle |

The invention claimed is:
1. A hydraulic engine mount having a dividing means for dividing an inner space of a housing into an upper fluid chamber and a lower fluid chamber, the hydraulic engine mount comprising:

a first channel formed along a first path of the dividing means and providing a moving channel of fluid between the upper fluid chamber and the lower fluid chamber;
a second channel formed along a second path of the dividing means and providing a moving channel of fluid between the upper fluid chamber and the lower fluid chamber; and
a solenoid device installed in the housing and having a first solenoid valve body for opening and closing the second channel,
wherein the dividing means forms an air chamber below a membrane, which is connected to an external atmosphere through the membrane installed on a top surface,
wherein the solenoid device comprises a second solenoid valve body for opening and closing an entrance of the air chamber, and
wherein if the first solenoid valve body and the second solenoid valve body close the second channel and the air chamber the fluid operates through the first channel generating the peak damping at a first frequency range of relatively low frequencies and maintains the closed state of the air chamber so as to increase damping force,
wherein if the first solenoid valve body and the second solenoid valve body open the second channel and the air chamber the fluid operates through the first and second channels generating a peak damping at a second frequency range of relatively high frequencies so as to reduce damping force.

2. The hydraulic engine mount of claim 1, wherein the first solenoid valve body and the second solenoid valve body are connected to each other through an axle so that the second channel and the entrance of the air chamber are opened and closed at the same time by an operation of the solenoid device.

3. The hydraulic engine mount of claim 2, wherein the dividing means comprises:
a main body portion including a valve-installing portion formed at one side to which each of end portions of the first solenoid valve body and the second solenoid valve body is inserted and installed, a spiral groove for forming the first channel spirally along an edge of the top surface, and a through-hole penetrating upwards and downwards through an edge and forming the entrance of the second channel;
a second channel-forming member installed on a bottom surface of the main body portion, connected with the through-hole, and forming the second channel along an edge of the bottom surface of the main body portion;
the membrane forming the air chamber by covering the top surface of the main body portion; and
a cover plate forming the first channel by covering the spiral groove and having at least a hole, through which fluid in the upper fluid chamber passes, at a central portion.

4. The hydraulic engine mount of claim 3, wherein the second channel-forming member is formed by combining a pair of groove members formed with grooves along the perimeter so as to face each other up and down.

5. The hydraulic engine mount of claim 2, wherein the first frequency range is 7~8 Hz and the second frequency range is 11~12 Hz.

6. The hydraulic engine mount of claim 1, wherein the dividing means comprises:
a main body portion including a valve-installing portion formed at one side to which each of end portions of the first solenoid valve body and the second solenoid valve body is inserted and installed, a spiral groove for forming the first channel spirally along an edge of the top surface, and a through-hole penetrating upwards and downwards through an edge and forming the entrance of the second channel;
a second channel-forming member installed on a bottom surface of the main body portion, connected with the through-hole, and forming the second channel along an edge of the bottom surface of the main body portion;
the membrane forming the air chamber by covering the top surface of the main body portion; and
a cover plate forming the first channel by covering the spiral groove and having at least a hole, through which fluid in the upper fluid chamber passes, at a central portion.

7. The hydraulic engine mount of claim 6, wherein the second channel-forming member is formed by combining a pair of groove members formed with grooves along the perimeter so as to face each other up and down.

8. The hydraulic engine mount of claim 1, wherein the first frequency range is 7~8 Hz and the second frequency range is 11~12 Hz.

* * * * *